US010011428B2

(12) United States Patent
Sasakuma et al.

(10) Patent No.: US 10,011,428 B2
(45) Date of Patent: Jul. 3, 2018

(54) COATING RUBBER COMPOSITION FOR CONVEYER BELTS

(71) Applicant: The Yokohama Rubber Co., Ltd., Tokyo (JP)

(72) Inventors: Hidehiro Sasakuma, Kanagawa (JP); Ryotaro Suefuji, Kanagawa (JP); Gang Hou, Kanagawa (JP); Atsushi Miyajima, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 15/306,342

(22) PCT Filed: Apr. 10, 2015

(86) PCT No.: PCT/JP2015/061261
§ 371 (c)(1),
(2) Date: Oct. 24, 2016

(87) PCT Pub. No.: WO2015/163168
PCT Pub. Date: Oct. 29, 2015

(65) Prior Publication Data
US 2017/0043954 A1 Feb. 16, 2017

(30) Foreign Application Priority Data

Apr. 25, 2014 (JP) .................. 2014-091294

(51) Int. Cl.
| B65G 15/32 | (2006.01) |
| B65G 15/34 | (2006.01) |
| B32B 25/10 | (2006.01) |
| C08K 3/04 | (2006.01) |
| C08L 7/00 | (2006.01) |
| C08L 9/00 | (2006.01) |
| C08K 3/26 | (2006.01) |
| C08L 91/00 | (2006.01) |
| C09D 109/00 | (2006.01) |
| C09D 109/06 | (2006.01) |
| B29D 29/00 | (2006.01) |

(52) U.S. Cl.
CPC .............. *B65G 15/34* (2013.01); *B32B 25/10* (2013.01); *C08K 3/26* (2013.01); *C08L 7/00* (2013.01); *C08L 9/00* (2013.01); *C08L 91/00* (2013.01); *C09D 109/00* (2013.01); *C09D 109/06* (2013.01); *B29D 29/00* (2013.01); C08K 3/04 (2013.01); C08K 2003/265 (2013.01); C08K 2201/006 (2013.01)

(58) Field of Classification Search
CPC ........ B65G 15/32; B65G 15/34; B32B 25/10; C08K 3/04; C08L 7/00; C08L 9/00
USPC ............ 198/844.1, 844.2, 846, 847; 156/137
See application file for complete search history.

(56) References Cited

U.S. PATENT DOCUMENTS

| 5,260,123 | A  | * | 11/1993 | Hergenrother ......... B32B 25/10 428/447 |
| 6,193,835 | B1 | * | 2/2001 | Yoshikawa ................ C08J 5/12 156/281 |
| 6,632,319 | B1 | * | 10/2003 | Yoshikawa ................ C08J 3/24 156/151 |
| 7,138,450 | B2 | * | 11/2006 | Wentworth .............. C08K 5/10 152/565 |
| 7,872,066 | B2 |   | 1/2011 | Okamoto et al. |
| 2009/0312484 | A1 |   | 12/2009 | Okamoto et al. |
| 2016/0096684 | A1 | * | 4/2016 | Sasakuma et al. |
| 2017/0051082 | A1 | * | 2/2017 | Blok et al. |
| 2017/0306107 | A1 | * | 10/2017 | Xiong et al. |

FOREIGN PATENT DOCUMENTS

| CN | 101568583 A | 10/2009 |
| JP | 2562069 | 10/1997 |
| JP | 2000-344318 | 12/2000 |
| JP | 2009-040815 | 2/2009 |
| JP | 2009-292960 | 12/2009 |

OTHER PUBLICATIONS

International Preliminary Report on Patentability and Written Opinion from corresponding PCT application No. PCT/JP2015/061261 dated Oct. 25, 2016 (6 pgs).
International Search Report from corresponding PCT application No. PCT/JP2015/061261 dated Jun. 23, 2015 (2 pgs).

* cited by examiner

*Primary Examiner* — Douglas A Hess
(74) *Attorney, Agent, or Firm* — Brinks Gilson & Lione

(57) ABSTRACT

A coating rubber composition for a conveyer belt, comprising 15 to 75 parts by mass of carbon black having a nitrogen adsorption specific surface area of 50 $m^2/g$ or less, 25 to 100 parts by mass of calcium carbonate and 40 parts or less by mass of an oil per 100 parts by mass of blended rubber comprising of natural rubber and at least one of either butadiene rubber or SBR. The above coating rubber composition for conveyer belts can improve not only the peel force which is a criterion of adhesiveness with the canvas cloth but also the power-saving capability of the conveyer belt while maintaining the durability thereof. Further, compounding of silica in an amount of 5 to 20 parts by mass can achieve a sufficient rubber attachability onto the canvas cloth when over-vulcanized, while maintaining the peel force when subjected to normal vulcanization.

7 Claims, No Drawings

COATING RUBBER COMPOSITION FOR CONVEYER BELTS

RELATED APPLICATION

This application is a 35 U.S.C. § 371 national phase filing of International Patent Application No. PCT/JP2015/061261, filed Apr. 10, 2015, through which and to which priority is claimed under 35 U.S.C. § 119 to Japanese Patent Application No. 2014-091294, filed Apr. 25, 2014, the complete disclosures of each of which is hereby expressly incorporated by reference.

TECHNICAL FIELD

The present invention relates to a coating rubber composition for conveyer belts. More particularly, the present invention relates to a coating rubber composition for conveyer belts which can be suitably used as coating rubber-forming materials and the like, which are used for adhesion between a rubber cover and a canvas cloth of the conveyer belt and/or between canvas cloths.

BACKGROUND ART

When an endless conveyer belt is repeatedly bent at regions of the head pulley and the tail pulley, the rubber cover of the belt may curl up at the end portion, and consequently detach phenomenon at the endless joint if adhesion is not sufficient. The endless conveyer belt is particularly susceptible to such detachment in a case where the upper surface rubber cover is thick. Once the detachment of the end portion of the rubber cover reaches the core canvas cloth, the conveyer belt may break due to abrasion and deterioration.

Accordingly, used are the methods of joining a layered belt body, comprising rubber covers and a core canvas cloth sandwiched therebetween, at the end portions thereof to form a conveyer belt in an endless configuration, wherein the upper surface rubber cover of each end portion of the belt body is cut from the core canvas cloth towards the outside in a step-like pattern to form a joining surface, and the joining is performed while each end portion of the belt body pressed against each other (Patent Documents 1 and 2).

Meanwhile, in order to achieve the adhesion of a canvas cloth to a rubber cover which comprises a conveyer belt, a coating rubber-forming material is used between the rubber cover and the canvas cloth, or between canvas cloths. Alternatively, the coating rubber-forming material is used for both between the rubber cover and the canvas cloth and between canvas cloths. While good adhesiveness between the coating rubber and the canvas cloth results in excellent durability of the conveyer belt, the peeling work intended for exposing the core canvas cloth during the endlessing of the conveyer belt often tends to become difficult. This also applies to between canvas cloths. To facilitate the endlessing workability, an approach comprising increasing the amount of calcium carbonate contained in the coating rubber-forming material is used. This approach, however, may disadvantageously result in deteriorated durability.

The present applicant has previously proposed a coating rubber composition for conveyer belts as a coating rubber-forming material used for adhesion between a rubber cover and a canvas cloth and/or between canvas cloths when producing an endless belt by joining the end portions of a conveyer belt which is configured so that a canvas cloth is adhered to a rubber cover, wherein the coating rubber composition has an appropriately attenuated adhesive power to allow for facilitation of the endlessing workability, while improving the adhesion durability between the rubber cover and the canvas cloth or between canvas cloths as compared with a case where the peel force is reduced due to increased amount of calcium carbonate in the coating rubber-forming material. That is, proposed is a coating rubber composition for conveyer belts in which carbon black and calcium carbonate are compound as fillers in diene-based rubber, comprising, blended rubber consisting of 82.5 to 52.5 mass % of diene-based rubber and 17.5 to 47.5 mass % of rubber component from reclaimed rubber, and 10 to 85 parts by mass of calcium carbonate per 100 parts by mass of the blended rubber (Patent Document 3).

In a case where the above coating rubber composition for conveyer belts is used as a coating rubber-forming material intended for between a rubber cover and a canvas cloth of a conveyer belt, between canvas cloths or both of these in order to form an reinforced layer, the adhesive power is appropriately attenuated to facilitate the endlessing workability involving peeling, while maintaining sufficient durable adhesiveness between them. Therefore, the above coating rubber composition can sufficiently achieve the desired objective of allowing the conveyer belt to operate stably over a prolonged period.

Here, in view of durability, the coating rubber used between the rubber cover and the canvas cloth or between canvas cloths is required to have good adhesiveness in addition to a high peel force. Generally, when a high peel force is required, carbon black having a small particle diameter is compounded with the coating rubber to obtain the high peel force. In this case, however, the rubber attachability (when visually observing rubber adhering onto the surface of a canvas cloth after peeling tests, cases where disruptions due to the peeling are occurring on the whole surface of the coating rubber layer are taken as 100%) on the peeled surface will decrease. Meanwhile, a method consisting of compounding carbon black having a large particle diameter and a large amount of calcium carbonate may be used to improve the rubber attachability on the peeled surface. In this case, however, the peel force will decrease. As described above, the peel force and the rubber attachability on the adhesion surface are in a contrary relationship, and thus cannot be satisfied simultaneously.

Furthermore, the present applicant has proposed a coating rubber composition for conveyer belts as a coating rubber-forming material used for adhesion between a rubber cover and a canvas cloth and/or between canvas cloths, the coating rubber composition capable of yielding a vulcanized material simultaneously having both improved peel force and rubber attachability between the rubber cover and the canvas cloth or between canvas cloths, and comprising carbon black and calcium carbonate compounded as fillers in diene-based rubber, wherein the coating rubber composition comprises blended rubber consisting of 83.0 to 97.5 mass % of the diene-based rubber and 2.5 to 17.0 mass % of rubber component from reclaimed rubber, and 45 to 75 parts by mass of carbon black having a nitrogen adsorption specific surface area of 30 to 50 $m^2/g$ and a DBP oil absorption of 95 to 125 ml/100 g, and 5 to 50 parts by mass of calcium carbonate per 100 parts by mass of the blended rubber (Patent Document 4).

Furthermore, while adhesiveness with the canvas cloth has been the major issue for conventional coating rubbers, there is a need to reduce energy loss at the core portion to confer a power-saving capability on a conveyer belt. There have been demands for a coating rubber capable of reducing energy loss which occurs when a moving conveyer belt bends due to objects loaded onto it.

Moreover, when used as an endless belt in which the ends of the belt body are joined to each other, the belt is exposed to over-vulcanization state due to a prolonged vulcanization such as re-vulcanization at the endless portion. Therefore, adhesion performance also needs to be sufficiently achieved even when over-vulcanized.

However, the rubber attachability value with the canvas cloth is low when over-vulcanized, and good adhesiveness is difficult to obtain. In order to improve the rubber attachability upon over-vulcanization, an adhesive-based compounding agent can also be compounded. This, however, cannot prevent the peel force from reducing when normally vulcanized.

PRIOR ART DOCUMENT

Patent Document

Patent Document 1: Japanese Utility Model No. 2562069
Patent Document 2: Japanese Patent Application Laid-Open No. 2000-344318
Patent Document 3: Japanese Patent Application Laid-Open No. 2009-40815
Patent Document 4: Japanese Patent Application Laid-Open No. 2009-292960

OUTLINE OF THE INVENTION

Problem to be Solved by the Invention

The primary objective of the present invention is to provide a coating rubber composition for conveyer belts having not only an improved peel force as a criterion of adhesiveness with canvas cloths but also an improved power-saving capability while maintaining the durability of the conveyer belt.

Another objective of the present invention is to provide a coating rubber composition for conveyer belts capable of ensuring sufficient rubber attachability with canvas cloths when over-vulcanized and having good adhesiveness, while maintaining the peel force and low energy loss when subjected to normal vulcanization.

Means for Solving the Problem

The primary objective of the present invention can be achieved by providing a coating rubber composition for conveyer belts, comprising 15 to 75 parts by mass of carbon black with a nitrogen adsorption specific surface area of 50 $m^2/g$ or less, 25 to 100 parts by mass of calcium carbonate, and 40 parts or less by mass of oil per 100 parts by mass of blended rubber comprising of natural rubber and at least one of either butadiene rubber or SBR.

The other objective of the present invention can be achieved by the above coating rubber composition wherein the amounts of carbon black and calcium carbonate are respectively changed to 10 to 65 parts by mass and 20 to 100 parts by mass, and 5 to 20 parts by mass of silica is further compounded.

Effect of the Invention

The coating rubber composition for conveyer belts according to the present invention can improve not only the adhesiveness of the conveyer belt to the canvas cloth but also the power-saving capability while maintaining its durability. Here, the coating rubber composition comprises 15 to 70 parts by mass of carbon black having a specific property and 25 to 100 parts by mass of calcium carbonate, and further comprises 40 parts by mass of oil or less, preferably 10 to 35 parts by mass per 100 parts by mass of the blended rubber.

Moreover, by further compounding 5 to 20 parts by mass of silica, sufficient rubber attachability with the canvas cloth can be ensured, resulting in good adhesiveness even when over-vulcanized, while maintaining the peel force and the power-saving capability during normal vulcanization. This can provide an endless belt in which the ends of the belt body are well vulcanized and adhered to each other.

EMBODIMENTS FOR CARRYING OUT THE INVENTION

In the present invention, used is a blended rubber comprising of natural rubber and at least one of either butadiene rubber or SBR. The blended rubber comprises natural rubber in a proportion of 15 to 65 mass %, preferably 25 to 55 mass %, and butadiene rubber and/or SBR in a proportion of 85 to 35 mass %, preferably 75 to 45 mass %, respectively. When natural rubber is used outside of this range the rubber attachability deteriorates. Note that any of emulsion-polymerized SBR, solution-polymerized SBR or oil-extended products thereof can be used as SBR.

Carbon black having a nitrogen adsorption specific surface area of 50 $m^2/g$ or less, specifically GPF carbon black, FEF carbon black, SRF carbon black and the like, is used at a proportion of 15 to 70 parts by mass, preferably 20 to 65 parts by mass, per 100 parts by mass of the blended rubber. When the amount of carbon black is less than this, the rubber attachability deteriorates. On the other hand, when the amount of carbon black is more than this, energy loss increases. Furthermore, energy loss increases when carbon black having a nitrogen adsorption specific surface area larger than the above, such as HAF carbon black, is used.

Calcium carbonate is used at a proportion of 25 to 100 parts by mass, preferably 30 to 70 parts by mass, per 100 parts by mass of the blended rubber. When the amount of calcium carbonate is less than this the rubber attachability deteriorates. On the hand, when the amount of calcium carbonate is more than this the peel force decreases and hardness increases.

As oil, aroma oil, paraffin oil and the like are used, and oil component contained in oil extended SBR is also counted as oil. Oil is used at a proportion of 40 parts by mass or less, preferably 10 to 35 parts by mass, per 100 parts by mass of the blended rubber. When the amount of oil is higher than this energy loss increases. Note that in Examples of Patent Documents 3 and 4, oil is used at a proportion higher than this.

In the coating rubber composition for conveyer belts according to the present invention, a rubber composition, wherein the amounts of carbon black and calcium carbonate are respectively changed to 10 to 65 parts by mass and 20 to 100 parts by mass, and 5 to 20 parts by mass of silica is further compounded, is used in order to improve the rubber attachability with canvas cloths when over-vulcanized.

Further compounding of silica increase the values of hardness and tan δ, and thus the amounts of carbon black and calcium carbonate may be slightly changed to adjust such values.

As silica, used are those having a BET specific surface area (in accordance with ASTM D1993-03) of 70 to 200 $m^2/g$, preferably 70 to 190 $m^2/g$, in view of reinforceability and dispersibility. These are dry-process silica manufactured by pyrolysis of silicon halides or organosilicon compounds and the like, or wet-process silica manufactured by acid decomposition of sodium silicate and the like. Wet-process silica is preferably used in view of cost and performance. In actuality, commercially available products currently on the market for use in the rubber industry can be used as they are.

The compounding proportion of silica is usually 5 to 20 parts by mass, preferably 10 to 15 parts by mass, per 100 parts by mass of the blended rubber. Compounding silica can improve the rubber attachability with the canvas cloth when over-vulcanized. When the compounding proportion of silica less is than this the rubber attachability with canvas cloths cannot be desirably improved. On the other hand, the compounding proportion of silica is more than this energy loss increases.

In order to enhance properties required for silica as described above and the dispersibility into diene based rubber (silica has a poor affinity with rubber polymer, and mutually tends to form hydrogen bonds through silanol groups to decrease its dispersibility into rubber), a silane coupling agent is preferably compounded. As a silane coupling agent, preferably used is a polysulfide-based silane coupling agent having an alkoxy silyl group reactive with a silanol group on the surface of silica and a sulfur chain reactive with polymer, such as:
bis(3-triethoxysilylpropyl)tetrasulfide,
bis(2-triethoxysilylethyl)tetrasulfide,
bis(3-trimethoxysilylpropyl)tetrasulfide,
bis(3-triethoxysilylpropyl)disulfide.

Vulcanization of the coating rubber composition for conveyer belts is performed with at least one of vulcanization accelerators such as sulfur and thiazole-based accelerators (MBT, MBTS, ZnMBT and the like), sulfenamide-based accelerators (CBS, DCBS, BBS and the like), guanidine-based accelerators (DPG, DOTG, OTBG and the like), thiuram-based accelerators (TMTD, TMTM, TBzTD, TETD, TBTD and the like), dithiocarbamate-based accelerators (ZTC, NaBDC and the like), and xanthate-based accelerators (ZnBX and the like). Sulfur or various vulcanization accelerators are preferably used in a proportion of about 1 to 5 parts by mass, preferably about 2 to 4 parts by mass, per 100 parts by mass of blended rubber. Over-vulcanization may occur when a large amount of sulfur or various vulcanization accelerators is used, but the vulcanizing time has much more significant effects.

The followings may appropriately be compounded in the coating rubber composition for conveyer belts according to the present invention in addition to the above components: vulcanization aids, vulcanization retardants, and various compounding agents such as various reinforcers other than carbon black, calcium carbonate and silica (bulking agents), anti-aging agents, antioxidizing agents, pigments (dyes), plasticizing agents, flame retardants, solvents, surfactants (including leveling agents), dispersing agents, dehydrating agents, anticorrosives, adhesion-conferring agents, antistatic agents, fillers (bulking agents) and processing aids, in a range where the objectives of the present invention are not interfered.

After kneaded with rolls, kneaders, Banbury mixers and the like, the resulting coating rubber composition for conveyer belts may be used for adhesion between a rubber cover and a canvas cloth of a conveyer belt or between canvas cloths (or both of these) as a coating rubber-forming material. Specifically, the coating rubber composition for conveyer belts is press-bonded to both surfaces of the canvas cloth using calender rolls and the like to obtain a sheet-like reinforcement layer. Then, at least one layer of the above sheet-like reinforcement layer is laminated. An upper and lower surface rubber covers are then respectively laminated on the upper and lower surfaces of the reinforcement layer. Subsequently, the rubber covers are adhered to the canvas cloth, for example, by pressuring for about 10 to 60 minutes at a temperature of about 140 to 170° C., to produce a conveyer belt. The canvas cloth is fabricated by weaving organic fiber, such as nylon, polyester, vinylon and aramid, into a canvas-like cloth, and is used as a core reinforcement layer.

Here, when used as an endless belt in which the ends of the belt body are joined to each other, the belt is exposed to over-vulcanization due to a prolonged vulcanization such as re-vulcanization at the endless portion. Nonetheless, sufficient adhesiveness also needs to be achieved even when over-vulcanized. Therefore, the vulcanization time is extended to about 90 to 150 minutes in total.

EXAMPLES

Next, the present invention will be described with reference to Examples.

Example 1

| | |
|---|---|
| Natural rubber (RSS #3) | 50 parts by mass |
| Butadiene rubber | 50 parts by mass |
| GPF carbon black (having a nitrogen adsorption specific surface area of 29 m²/g) | 37 parts by mass |
| Calcium carbonate | 30 parts by mass |
| Aroma oil (A-OMIX, product of Sankyo Yuka Kogyo K. K.) | 22.50 parts by mass |
| Sulfur | 2.5 parts by mass |
| Vulcanization accelerator CZ (product of Ouchi Shinko Chemical Industrial Co., Ltd.) | 1.0 parts by mass |

The above components were kneaded with a Banbury mixer and the like to prepare a coating rubber composition for conveyer belts.

Example 2

A coating rubber composition for conveyer belts was prepared as in Example 1, except that 68.74 parts by mass of oil extended SBR (Nipol 1723, product of Zeon Corporation) (50 parts by mass as SBR and oil component being 18.74 parts by mass) was used instead of butadiene rubber, and that the amount of aroma oil was changed to 3.80 parts by mass (the total amount of oil component being 22.54 parts by mass).

Example 3

A coating rubber composition for conveyer belts was prepared as in Example 1, except that the amount of butadiene rubber was changed to 24.54 parts by mass, and 35.00 parts by mass of oil extended SBR (Nipol 1723) (25.46 parts by mass as SBR, oil component being 9.54 parts by mass) was further used, and that the amount of aroma oil was also changed to 13.00 parts by mass (the total amount of oil component being 22.54 parts by mass).

Example 4

A coating rubber composition for conveyer belts was prepared as in Example 3, except that, instead of GPF carbon black, the same amount of FEF carbon black (having a nitrogen adsorption specific surface area of 42 m$^2$/g) was used.

Example 5

A coating rubber composition for conveyer belts was prepared as in Example 3, except that, instead of GPF carbon black, the same amount of SRF carbon black (having a nitrogen adsorption specific surface area of 24 m$^2$/g) was used.

Example 6

A coating rubber composition for conveyer belts was prepared as in Example 4, except that the amounts of natural rubber, butadiene rubber, oil extended SBR and aroma oil were changed respectively to 19.88 parts by mass, 46.96 parts by mass, 45.60 parts by mass (33.16 parts by mass as SBR, oil component being 12.44 parts by mass) and 20.00 parts by mass (the total amount of oil component being 32.44 parts by mass), and that 50.0 parts by mass of FEF carbon black was used.

The following properties were measured for the coating rubber compositions for conveyer belts obtained from each of the above Examples:

Normal physical properties: 100% modulus in accordance with JIS K6251-2004 and hardness in accordance with JIS K6253 at room temperature were measured for a vulcanized material obtained after press vulcanizing the target composition at 150° C. for 30 minutes
Here, preferable hardness is 45 to 60

Adhesiveness with canvas cloth: The peel force for a polyester canvas cloth (in accordance with JIS K6256-1: 2006 "Peel force Adhesion to textile fabric") and the rubber attachability (rubber attached onto the surface of a canvas cloth is visually observed after peeling tests; when disruptions due to peeling are observed on the whole surface of the coating rubber layer, the rubber attachability is 100%, which shows the best adhesiveness) was measured for a vulcanized material subjected to normal vulcanization (at 150° C. for 30 minutes)
Here, coating rubber compositions having a peel force of 6.0 N/mm or more and a rubber attachability of 60% or more are considered to have excellent durability as coating rubber for conveyer belts Calender processability (Vm): Mooney scorch was measured in accordance with JIS K6300-1:2013 "unvulcanized rubber" to determine the minimum viscosity
Here, the preferable minimum viscosity is 20 to 40 tan δ (20° C.): Using a viscoelastic spectrometer (product of Toyo Seiki Seisaku-Sho Ltd.), tan δ at 20° C. was measured for a vulcanized material subjected to normal vulcanization (at 150° C. for 30 minutes)
Note that measurements of tan δ were performed while a test piece was stretched by 10%, and vibrations with an amplitude of ±2% were given at a vibration frequency of 20 Hz
Here, a value of tan δ of 0.15 or less can reduce energy loss due to bending of a moving conveyer belt, and can be considered to have an excellent power-saving capability Measurement results are shown in Table 1 below.

TABLE 1

| Measured Items | Ex 1 | Ex 2 | Ex 3 | Ex 4 | Ex 5 | Ex 6 |
|---|---|---|---|---|---|---|
| Normal physical properties | | | | | | |
| 100% modulus (MPa) | 1.8 | 1.9 | 1.8 | 2.1 | 1.6 | 2.1 |
| Hardness | 52 | 51 | 51 | 54 | 50 | 54 |
| Adhesiveness with canvas cloth | | | | | | |
| Peel force (N/mm) | 7.8 | 7.5 | 8.2 | 7.9 | 7.3 | 8.9 |
| Rubber attachability (%) | 80 | 65 | 65 | 70 | 60 | 90 |
| Vm (point) | 25.3 | 31.4 | 28.9 | 30.9 | 27.7 | 28.3 |
| tan δ (20° C.) | 0.090 | 0.117 | 0.099 | 0.121 | 0.088 | 0.148 |

Comparative Example 1

A coating rubber composition for conveyer belts was prepared as in Example 3, except that the amount of GPF carbon black was changed to 10.00 parts by mass.

Comparative Example 2

A coating rubber composition for conveyer belts was prepared as in Example 3, except that the amount of GPF carbon black was changed to 80.00 parts by mass.

Comparative Example 3

A coating rubber composition for conveyer belts was prepared as in Example 3, except that the amount of calcium carbonate was changed to 20.00 parts by mass.

Comparative Example 4

A coating rubber composition for conveyer belts was prepared as in Example 3, except that the amount of calcium carbonate was changed to 105.00 parts by mass.

Comparative Example 5

A coating rubber composition for conveyer belts was prepared as in Example 3, except that the amounts of natural rubber, butadiene rubber, oil extended SBR and aroma oil were changed respectively to 39.77 parts by mass, 27.07 parts by mass, 45.60 parts by mass (33.16 parts by mass as SBR, and 12.44 parts by mass as oil component) and 30.00 parts by mass (the total amount of oil component being 42.44 parts by mass), and that 63.0 parts by mass of FEF carbon black was used instead of GPF carbon black.

Comparative Example 6

A coating rubber composition for conveyer belts was prepared as in Example 3, except that the amount of oil extended SBR was changed to 103.75 parts by mass (75.46 parts by mass as SBR, and 28.29 parts by mass as oil component), and that natural rubber and aroma oil were not used.

Comparative Example 7

A coating rubber composition for conveyer belts was prepared as in Example 6, except that the amount of natural rubber was changed to 66.84 parts by mass, and the amount of oil extended SBR was changed to 45.60 parts by mass (33.16 parts by mass as SBR, and 12.44 parts by mass as oil component <the total amount of oil component being 32.44 parts by mass>).

Comparative Example 8

A coating rubber composition for conveyer belts was prepared as in Example 2 where butadiene rubber was not used, except that the amounts of natural rubber, oil extended SBR, GPF carbon black, calcium carbonate and aroma oil were changed respectively to 25.00 parts by mass, 64.93 parts by mass (47.22 parts by mass as SBR, and 17.71 parts by mass as oil component), 10.00 parts by mass, 80.00 parts by mass and 3.00 parts by mass, and that 55.56 parts by mass of Grade A tire-reclaimed rubber (Tire Rec Purple line, product of Muraoka Rubber Reclaiming Co., Ltd.) (27.78 parts by mass as rubber component, 16.67 parts by mass as carbon component <the total amount of carbon components being 26.67 parts by mass>, and 11.11 parts by mass as oil component <the total amount of oil component being 31.82 parts by mass>) was further used.

Comparative Example 9

A coating rubber composition for conveyer belts was prepared as in Example 2 where butadiene rubber was not used, except that the amounts of natural rubber, oil extended SBR, GPF carbon black, calcium carbonate and aroma oil were changed respectively to 30.00 parts by mass, 74.20 parts by mass (53.97 parts by mass as SBR, and 20.23 parts by mass as oil component), 60.00 parts by mass, 61.00 parts by mass and 28.00 parts by mass, and that 32.00 parts by mass of Grade A tire-reclaimed rubber (Tire Rec Purple Line) (16.00 parts by mass as rubber component, 9.60 parts by mass as carbon component <the total amount of carbon component being 69.60 parts by mass>, and 6.40 parts by mass as oil component <the total amount of oil component being 54.63 parts by mass>) was further used.

The results obtained from Comparative Examples described above are shown in Table 2 below.

The above results suggest the followings:
(1) In Comparative Example 1 where the amount of carbon black is too small, the rubber attachability is poor.
(2) In Comparative Example 2 where the amount of carbon black is too large, the energy loss is large.
(3) In Comparative Example 3 where the amount of calcium carbonate is too small, the rubber attachability is poor.
(4) In Comparative Example 4 where the amount of calcium carbonate is too large, the peel force is low and the hardness is large.
(5) In Comparative Example 5 where the amount of oil is too large, the energy loss is large.
(6) In Comparative Example 6 where natural rubber is not used, the rubber attachability is poor.
(7) In Comparative Example 7 where the blending proportion of natural rubber is too large, the rubber attachability is poor and the energy loss is large.
(8) In Comparative Example 8 where a general-purpose coating is used, the endlessing workability is improved, but the peel force is small.
(9) In Comparative Example 9 where a general-purpose coating is used, the energy loss is large.

Example 7

Regarding the coating rubber composition for conveyer belts prepared in Example 3, various properties were measured for a normally vulcanized material thereof (vulcanized at 150° C. for 30 minutes), and adhesiveness with a canvas cloth (the peel force and the rubber attachability to a polyester canvas cloth) was measured for an over-vulcanized material thereof (vulcanized at 150° C. for 140 minutes).

Example 8

A coating rubber composition for conveyer belts was prepared as in Example 7, except that the amounts of GPF carbon black and calcium carbonate were changed respectively to 32 parts by mass and 25 parts by mass, and that 10 parts by mass of silica (Nipsil AQ, product of Tosoh Silica Corporation) was further compounded. Then, measurements on normally vulcanized and over-vulcanized materials thereof were conducted in a similar manner as described above.

Example 9

A coating rubber composition for conveyer belts was prepared as in Example 8, except that the amounts of GPF

TABLE 2

| Measured Items | Comparative Examples | | | | | | | | |
|---|---|---|---|---|---|---|---|---|---|
| | 1 | 2 | 3 | 4 | 5 | 6 | 7 | 8 | 9 |
| Normal physical properties | | | | | | | | | |
| 100% modulus (MPa) | 1.4 | 2.8 | 1.9 | 2.8 | 2.1 | 2.2 | 2.2 | 1.4 | 1.7 |
| Hardness | 46 | 63 | 51 | 65 | 55 | 55 | 54 | 52 | 53 |
| Adhesiveness with canvas cloth | | | | | | | | | |
| Peel force (N/mm) | 7.9 | 8.9 | 7.7 | 2.7 | 9.5 | 6.5 | 9.8 | 5.8 | 7.3 |
| Rubber attachability (%) | 40 | 100 | 50 | 100 | 100 | 50 | 50 | 60 | 100 |
| Vm (point) | 25.8 | 36.6 | 27.5 | 25.9 | 26.8 | 31.9 | 28.5 | 30.9 | 24.2 |
| tan δ (20° C.) | 0.069 | 0.174 | 0.096 | 0.126 | 0.207 | 0.105 | 0.169 | 0.153 | 0.207 | carbon black, calcium carbonate and silica were changed respectively to 29 parts by mass, 20 parts by mass and 15 parts by mass. Then, measurements on normally vulcanized and over-vulcanized materials thereof were conducted in a similar manner as described above.

Comparative Example 10

A coating rubber composition for conveyer belts was prepared as in Example 8, except that the amounts of GPF carbon black and silica were changed respectively to 17 parts by mass and 30 parts by mass. Then, measurements on normally vulcanized and over-vulcanized materials thereof were conducted in a similar manner as described above.

Comparative Example 11

A coating rubber composition for conveyer belts was prepared as in Example 3, except that

| | |
|---|---|
| Adhesive-based compounding agent I (Penacolite Resin B-18-S, product of INDSPEC Chemical Co.) | 2 parts by mass |
| Adhesive-based compounding agent II (CYREZ964, product of Allnex) | 2 parts by mass | were further compounded. Then, measurements on normally vulcanized and over-vulcanized materials thereof were conducted in a similar manner as described above.

Measurement results from Examples 7 to 9 and Comparative Examples 10 to 11 as described above are shown in Table 3 below.

TABLE 3

| Measured Items | | Ex 7 | Ex 8 | Ex 9 | Comp. Ex. 10 | Comp. Ex. 11 |
|---|---|---|---|---|---|---|
| [Normally vulcanized material] Normal physical properties | | | | | | |
| 100% modulus | (MPa) | 1.8 | 1.8 | 1.7 | 1.6 | 1.9 |
| Hardness | | 51 | 52 | 53 | 54 | 51 |
| Adhesiveness with canvas cloth | | | | | | |
| Peel force | (N/mm) | 9.0 | 8.9 | 8.9 | 9.2 | 4.2 |
| Rubber attachability | (%) | 85 | 95 | 100 | 100 | 100 |
| Vm | (point) | 26.8 | 35.2 | 39.4 | 53.4 | 29.8 |
| tan δ | (20° C.) | 0.109 | 0.124 | 0.132 | 0.157 | 0.118 |
| [Over-vulcanized material] Adhesiveness with canvas cloth | | | | | | |
| Peel force | (N/mm) | 7.56 | 7.54 | 7.52 | 7.50 | 7.08 |
| Rubber attachability | (%) | 60 | 90 | 100 | 100 | 90 |

The above results suggest the followings:
(1) In Example 7, the rubber attachability of the over-vulcanized material is barely 60%.
(2) In Example 8 where 10 parts by mass of silica is compounded, the rubber attachability of the over-vulcanized material has significantly improved.
(3) In Example 9 where 20 parts by mass of calcium carbonate and 15 parts by mass of silica are compounded, the rubber attachability of the over-vulcanized material has significantly improved.
(4) In Comparative Example 10 where 30 parts by mass of silica is compounded, the minimum viscosity is high, resulting in deteriorated calender workability. In addition, the value of tan δ (20° C.) is high, resulting in increased energy loss.
(5) The adhesiveness with a canvas cloth for the over-vulcanized material is improved by compounding an adhesive-based compounding agent, but the adhesiveness with a canvas cloth (peel force) for the normally vulcanized material is decreased.

The invention claimed is:

1. A coating rubber composition for conveyer belts, comprising 15 to 75 parts by mass of carbon black having a nitrogen adsorption specific surface area of 50 $m^2/g$ or less, 25 to 100 parts by mass of calcium carbonate, and 40 parts or less by mass of oil per 100 parts by mass of blended rubber comprising of natural rubber and at least one of either butadiene rubber or SBR, wherein the amounts of carbon black and calcium carbonate are respectively changed to 10 to 65 parts by mass, and 20 to 100 parts by mass, and 5 to 20 parts by mass of silica is further compounded.

2. The coating rubber composition for conveyer belts according to claim 1, wherein the blended rubber comprises 15 to 65 mass % of natural rubber and 85 to 35 mass % of butadiene rubber or SBR.

3. The coating rubber composition for conveyer belts according to claim 1, wherein the amount of oil is 10 to 35 parts by mass.

4. The coating rubber composition for conveyer belts according to claim 1, for use as a coating rubber-forming material between a rubber cover and a canvas cloth of a conveyer belt and/or between canvas cloths.

5. A conveyer belt comprising an upper surface rubber cover layer, a sheet-like reinforcement layer and a lower surface rubber cover layer, wherein the coating rubber composition for conveyer belts according to claim 4 is used as a coating rubber-forming material for the reinforcement layer when the coating rubber composition is press bonded to both surfaces of a canvas cloth to form the sheet-like reinforcement layer.

6. The conveyer belt according to claim 5, wherein a peel force (in accordance with JIS K6256-1), which shows a criterion of adhesiveness with the canvas cloth, is 6 N/mm or more.

7. The conveyer belt according to claim 5 used as an endless belt in which the ends of a belt body are joined to each other.

* * * * *